US012124217B2

(12) United States Patent
Zaugg

(10) Patent No.: US 12,124,217 B2
(45) Date of Patent: Oct. 22, 2024

(54) NATURAL ESCAPEMENT FOR A HOROLOGICAL MOVEMENT AND HOROLOGICAL MOVEMENT COMPRISING SUCH AN ESCAPEMENT

(71) Applicant: Montres Breguet S.A., L'Abbaye (CH)

(72) Inventor: Alain Zaugg, Le Sentier (CH)

(73) Assignee: Montres Breguet S.A., L'Abbaye (CH)

( * ) Notice: Subject to any disclaimer, the term of this patent is extended or adjusted under 35 U.S.C. 154(b) by 479 days.

(21) Appl. No.: 17/567,459

(22) Filed: Jan. 3, 2022

(65) Prior Publication Data

US 2022/0283542 A1 Sep. 8, 2022

(30) Foreign Application Priority Data

Mar. 2, 2021 (EP) ..................................... 21160254
May 27, 2021 (EP) ..................................... 21176140

(51) Int. Cl.
*G04B 15/12* (2006.01)
*G04B 15/14* (2006.01)

(52) U.S. Cl.
CPC ............. *G04B 15/12* (2013.01); *G04B 15/14* (2013.01)

(58) Field of Classification Search
CPC ........ G04B 15/12; G04B 15/14; G04B 15/08; G04B 15/06
USPC .......................................................... 368/127
See application file for complete search history.

(56) References Cited

U.S. PATENT DOCUMENTS 7,708,455 B2 * 5/2010 Cabezas Jurin ..... G04B 17/063 368/131
2002/0088295 A1 * 7/2002 Oechslin ................ G04B 15/06 74/25
2012/0113764 A1 * 5/2012 Queval .................. G04B 15/14 368/127
2012/0207000 A1 * 8/2012 Journe ................... G04B 15/06 368/132

FOREIGN PATENT DOCUMENTS

CH 709328 A2 9/2015
CH 712631 A1 12/2017
CH 714200 A1 3/2019
DE 2458503 A1 6/1976
EP 1221637 A1 7/2002

OTHER PUBLICATIONS

European Search Report of No. 21176140 dated Oct. 5, 2021.

* cited by examiner

*Primary Examiner* — Edwin A. Leon
*Assistant Examiner* — Kevin Andrew Johnston
(74) *Attorney, Agent, or Firm* — Sughrue Mion, PLLC

(57) ABSTRACT

A natural escapement for a horological movement performing operating cycles each including a first and a second alternation of a balance (12) which comprises a balance wheel (14) on an axis (16) of which is adjusted a balance plate (18). The escapement (1) includes a first escapement wheel (8) driven by a second mobile (2), and driving a second escapement wheel (10) arranged in the same plane as the first escapement wheel (8). The escapement wheels form a kinematic chain after which is disposed an anchor (26) pivotable around an anchor rod (28) located outside an angle (α) less than 180° and delimited by two straight lines passing through axis (16) of balance wheel (14) and through a pivot axis of the first escapement wheel (8), and through (Continued)

the axis (16) of the balance wheel (14) and through a pivot axis of the second escapement wheel for the other.

18 Claims, 7 Drawing Sheets

NATURAL ESCAPEMENT FOR A HOROLOGICAL MOVEMENT AND HOROLOGICAL MOVEMENT COMPRISING SUCH AN ESCAPEMENT

CROSS REFERENCE TO RELATED APPLICATIONS

This application is claiming priority based on European Patent Application No. 21160254.5 filed on Mar. 2, 2021 and European Patent Application No. 21176140.8 filed on May 27, 2021, the disclosure of which is incorporated herein in its entirely by reference.

TECHNICAL FIELD OF THE INVENTION

The present invention relates to a natural escapement for a horological movement also known by its name tangential impulse escapement.

TECHNOLOGICAL BACKGROUND

The principle of the natural escapement was devised by Abraham Louis Breguet in the early 19th century. The advantage of the Breguet's natural escapement is in particular that it is a free escapement in so far as the balance is only disturbed by the operation of the escapement over a small fraction of its oscillation. The advantage of the Breguet's natural escapement is also that it gives each alternation an impulse which is direct and tangential to the balance. In other words, energy is transferred directly from the escapement wheel to the balance, without going through an anchor. Moreover, the energy is transmitted only tangentially, so that the frictions generated by the operation of this escapement are limited. Unlike the balance of a detent escapement, the balance of a natural escapement does not have a coup perdu; it receives a similar impulse with each alternation, in a symmetrical and more uniform manner, so that the losses of mechanical energy per coup perdu are suppressed. All these qualities make the natural escapement potentially one of the most efficient.

Breguet nevertheless subsequently discovered that the natural escapement he had imagined had certain disadvantages, foremost among which mention may be made of the fact that the last escapement wheel is not under the tension of the geartrain when the first wheel provides the impulse or when the latter is at rest. The various sets of geartrains and the quality of manufacture of the various components used in the composition of a Breguet's natural escapement can thus cause incorrect positioning of the last escapement wheel and, consequently, a malfunction of the escapement accompanied with parasitic noises. Furthermore, since the escapement wheel is free, its position is unstable, so that the operational safety of such a natural escapement is poor.

Of course, many improvements have been made to the original Breguet's natural escapement in an attempt to overcome the disadvantages mentioned above. Nevertheless, despite the efforts of successive watch manufacturers, difficulties remain. Some watchmakers have thus proposed to superimpose the two escapement wheels, a solution which, of course, increases the thickness of the movement and makes it difficult to integrate such a movement into a watch case. Other watch manufacturers have, in turn, proposed positioning the anchor between the two escapement wheels, in the plane of the latter. Here too, such a solution is bulky, this time in the plane of the movement. In addition, whether the escapement wheels are superimposed or the anchor is disposed between the two escapement wheels, it has been realised in practice that watchmakers have difficulty in accessing the various components of the escapement, in particular when it comes to adjusting the depth of penetration of the teeth of the second escapement wheel with the entry and exit pallets of the anchor.

SUMMARY OF THE INVENTION

The purpose of the present invention is to overcome the problems mentioned above as well as others by providing a natural escapement for a horological movement which is in particular less bulky.

To this end, the present invention relates to a natural escapement for a horological movement performing a succession of operating cycles each composed of a first and a second alternation of a balance which comprises a balance wheel on an axis of which is adjusted a balance plate, this natural escapement comprising a first escapement wheel arranged to be driven by a second mobile, this first escapement wheel in turn driving a second escapement wheel arranged in the same plane as the first escapement wheel, the first and second escapement wheels forming a kinematic chain after which is disposed an anchor capable of pivoting around an anchor rod located outside an angle less than 180° and delimited by two straight lines which pass through the axis of the balance wheel and through a pivot axis of the first escapement wheel for one, and through the axis of the balance wheel and through a pivot axis of the second escapement wheel for the other.

According to special embodiments of the invention:

- the balance plate carries a balance pin by which this balance plate causes the anchor to pivot at each of the first and second alternations, the balance plate also carrying a second impulse pallet through which this balance plate receives a direct and tangential driving impulse from the first escapement wheel during the first alternation, and a first impulse pallet through which this balance plate receives a direct and tangential driving impulse from the second escapement wheel during the second alternation, the balance pin being located outside an acute angle delimited by two straight lines which pass through the axis of the balance wheel and through the first impulse pallet, respectively through the second impulse pallet;
- the first escapement wheel comprises a toothing which extends in a single plane and through which this first escapement wheel meshes with the second escapement wheel and provides the direct and tangential driving impulse to the balance plate during the first alternation;
- the second escapement wheel comprises a toothing which extends in a single plane and through which this second escapement wheel meshes with the first escapement wheel and provides the direct and tangential driving impulse to the balance plate during the second alternation;
- the anchor comprises means for temporarily locking the second escapement wheel during the first alternation, and means for temporarily locking the second escapement wheel during the second alternation;
- the anchor comprises an exit pallet for temporarily locking the second escapement wheel during the second alternation, and an entry pallet for temporarily locking the second escapement wheel during the first alternation;
- the anchor comprises a fork formed of a first and a second horn, the balance plate abutting by its balance pin against the second horn of the fork and causing the pivoting of this anchor in a first direction during the first alternation, and against the first horn during the second alternation, causing the anchor to pivot in a second direction opposite to the first direction;

the fork carries a dart which cooperates with the balance plate to prevent accidental movements of the fork;

the first and second escapement wheels are each made in one piece and each comprise a single level of toothing.

The invention also relates to a horological movement comprising an escapement of the type described above.

Thanks to these features, the present invention provides a natural escapement wherein the first and second escapement wheels form a kinematic chain after which the anchor is disposed. This solution, much less bulky and therefore easier to be housed in a horological movement than when the anchor is disposed between the two escapement wheels, also offers easier access to watchmakers and allows them to adjust the depth of penetration of the teeth of the second escapement wheel with the entry and exit pallets of the anchor more conveniently. Moreover, the first and second escapement wheels are made in one piece and comprise a single level each. In other words, these first and second escapement wheels are not active at two distinct staged levels. They are therefore less bulky and easier to be machined. In addition, the necessary indexing of the teeth used to transmit driving impulses to the balance plate when using two superimposed escapement wheels is avoided. Indeed, in the case of the invention, the indexing of the single toothing of the first and second escapement wheels which ensures both the engagement of these two drive wheels with one another and the transmission of the driving impulses to the balance plate results from the very shape of this toothing.

BRIEF DESCRIPTION OF THE FIGURES

Other features and advantages of the present invention will emerge more clearly from the following detailed description of an embodiment of a natural escapement according to the invention, this example being given in a purely illustrative and non-limiting manner only in conjunction with the appended drawing wherein.

DETAILED DESCRIPTION OF THE INVENTION

Figure 1:
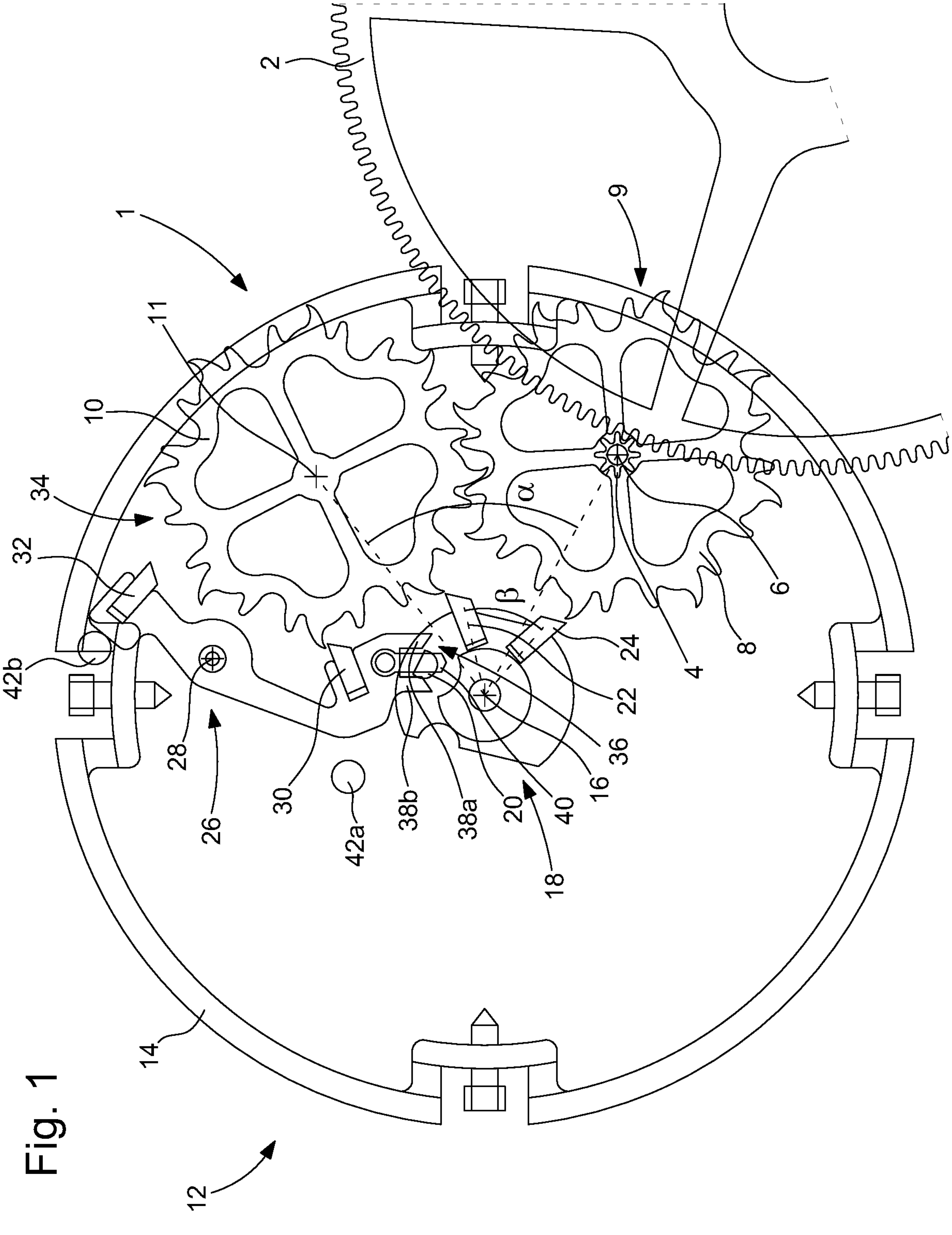
FIG. 1 is an overview of the natural escapement according to the invention.

The present invention proceeds from the general inventive idea which consists in disposing the anchor of a natural escapement also known by its name tangential impulse escapement, not between the first and second escapement wheels, but in the continuation of the kinematic chain formed by these first and second escapement wheels. Such an arrangement, much less bulky than when the anchor of the natural escapement is disposed between the escapement wheels, also offers the watchmaker easier access to the entry and exit pallets of the anchor and therefore more convenience to measure and adjust the depth of penetration of these pallets into the teeth of the second escapement wheel. Likewise, since the first and second escapement wheels are only active on a single level, they are thinner and therefore less bulky and easier to be machined. Furthermore, the indexing of their impulse teeth results from the very shape of their toothing and not from a tedious assembly of two superimposed escapement wheels.

Designated as a whole by the general reference numeral 1, the natural escapement according to the invention is arranged to be driven by a second mobile 2 which meshes with a pinion 4 fixedly mounted on an axis 6 of a first escapement wheel 8. This first escapement wheel 8 in turn meshes via a toothing 9 with a second escapement wheel 10 which pivots about an axis 11.

The natural escapement 1 also comprises a balance 12 which comprises a balance wheel 14 on an axis 16 of which is adjusted a balance plate 18. This balance plate 18 carries a balance pin 20 as well as a first and second impulse pallet 22 and 24, the respective roles of which will be described below.

The natural escapement 1 according to the invention finally comprises an anchor 26 pivoted around an anchor rod 28 and which carries an exit pallet 30 and an entry pallet 32.

Thanks to these exit 30 and entry 32 pallets which penetrate into a toothing 34 of the second escapement wheel 10, the anchor 26 is able to alternately lock and release this second escapement wheel 10. The anchor 26 also comprises a fork 36 formed of a first and a second horn 38*a* and 38*b* and which carries a dart 40. This dart 40 cooperates with the balance plate 18 and has the function of preventing accidental movements of the fork 36 outside periods during which the balance plate 18 is in its rest position. According to the invention, the anchor 26 is disposed after the second escapement wheel 10, at the exit of the kinematic chain formed by the first and second escapement wheels 8 and 10. More specifically, the pivot point of the anchor 26, materialised by the anchor rod 28, is located outside the angle α less than 180° and delimited by two straight lines which pass through the axis 16 of the balance wheel 14 and through the axis 6 of the first escapement wheel 8 for one, and through the axis 16 of the balance wheel 14 and through the axis 11 of the second escapement wheel 10 for the other. The natural escapement 1 according to the invention is therefore less bulky than the natural escapements of the prior art wherein the anchor is usually placed between and above the first and second escapement wheels. The natural escapement 1 according to the invention is therefore easier to be housed in the horological movement and regulates the operation of said horological movement. Likewise, the arrangement of the anchor 26 at the end of the kinematic chain formed by the first and second escapement wheels 8 and 10 makes the interventions of the watchmaker less difficult, in particular as regards measurement and adjustment of the depth of penetration of the exit 30 and entry 32 pallets into the toothing 34 of the second escapement wheel 10. The natural escapement 1 is completed by a first and a second abutment 42*a* and 42*b* which limit the pivoting displacement of the anchor 26.

In the embodiment of the natural escapement 1 according to the invention illustrated in the drawing, assumption is made that the second mobile 2 which supplies the natural escapement 1 with the energy necessary for its operation rotates in the counter-clockwise direction. The second mobile 2 consequently tends to rotate the pinion 4 and the first escapement wheel 8 on the axis 6 of which is fixed the pinion 4 in the clockwise direction, and the second escapement wheel 10 in the counter-clockwise direction.

Figure 2A:
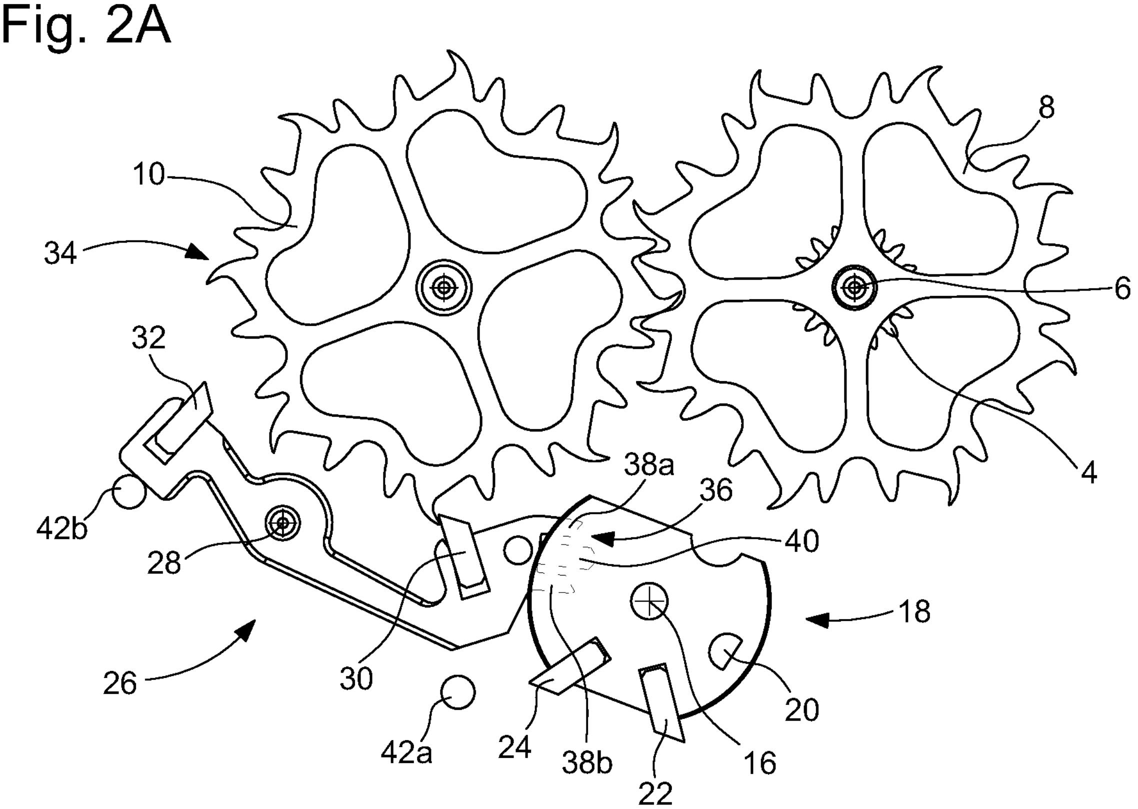
FIG. 2A is a view of the natural escapement in its first extreme position at the start of a cycle.
Figure 2B:
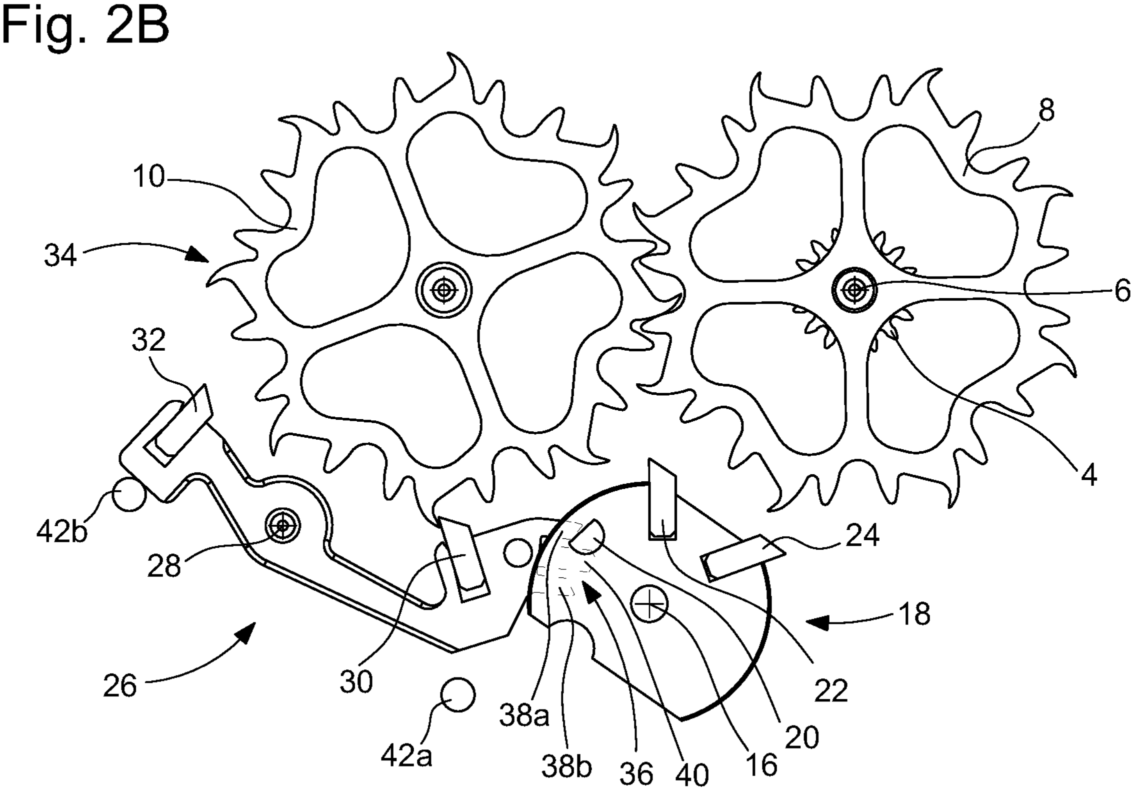
FIG. 2B is a view of the natural escapement in its rest position during the first alternation at the time when the balance plate is about to pivot the anchor.

An operating cycle of the natural escapement 1 according to the invention comprises two alternations during which the balance plate 18 will go successively from a first extreme position to a second extreme position passing through a median rest position, then from its second extreme position to its first extreme position, passing again through its median rest position. Thus, at the start of a cycle (see FIG. 2A), the second escapement wheel 10 is pressed on the exit pallet 30 and the natural escapement 1 is locked by pressing the anchor 26 against the second abutment 42*b*. Indeed, the angle of draw formed by pressing the tip of the tooth of the second escapement wheel 10 on the exit pallet 30 opposes a resistance to the release of the anchor 26 by tending to cause this anchor 26 to pivot in the counter-clockwise direction against the second abutment 42*b*. This function of drawing the anchor 26 on the second abutment 42*b* by the second escapement wheel 10 during the free portion of the alternation of the balance plate 18 is similar to that of Swiss lever escapements. The balance plate 18 then leaves this first extreme position by rotating in the counter-clockwise direction. At a given moment of its displacement during the first alternation (see FIG. 2B), the balance plate 18 reaches its median rest position. Just before reaching this position, the balance plate 18 abuts by its balance pin 20 against the second horn 38*b* of the fork 36 and causes the anchor 26 to pivot in the clockwise direction. The clockwise pivoting of the anchor 26 has the effect of releasing the second escapement wheel 10 from its engagement with the exit pallet 30, which allows the second mobile 2 to drive, via the first escapement wheel 8, the second escapement wheel 10 in the counter-clockwise direction (see FIG. 2C). The pivoting of the second escapement wheel 10 is again interrupted when, under the effect of the pivoting of the anchor 26, this second escapement wheel 10 is pressed on the entry pallet 32, this position being retained thanks to pressing the anchor 26 against the first abutment 42*a* (see FIG. 2D). Indeed, the angle of draw formed by pressing the tip of the tooth of the second escapement wheel 10 on the entry pallet 32 opposes a resistance to the release of the anchor 26 by tending to cause this anchor 26 to pivot in the clockwise direction against the first abutment 42*a*. This function of drawing the anchor 26 on the first abutment 42*a* by the second escapement wheel 10 during the free portion of the alternation of the balance plate 18 is similar to that of Swiss lever escapements.

Figure 2C:
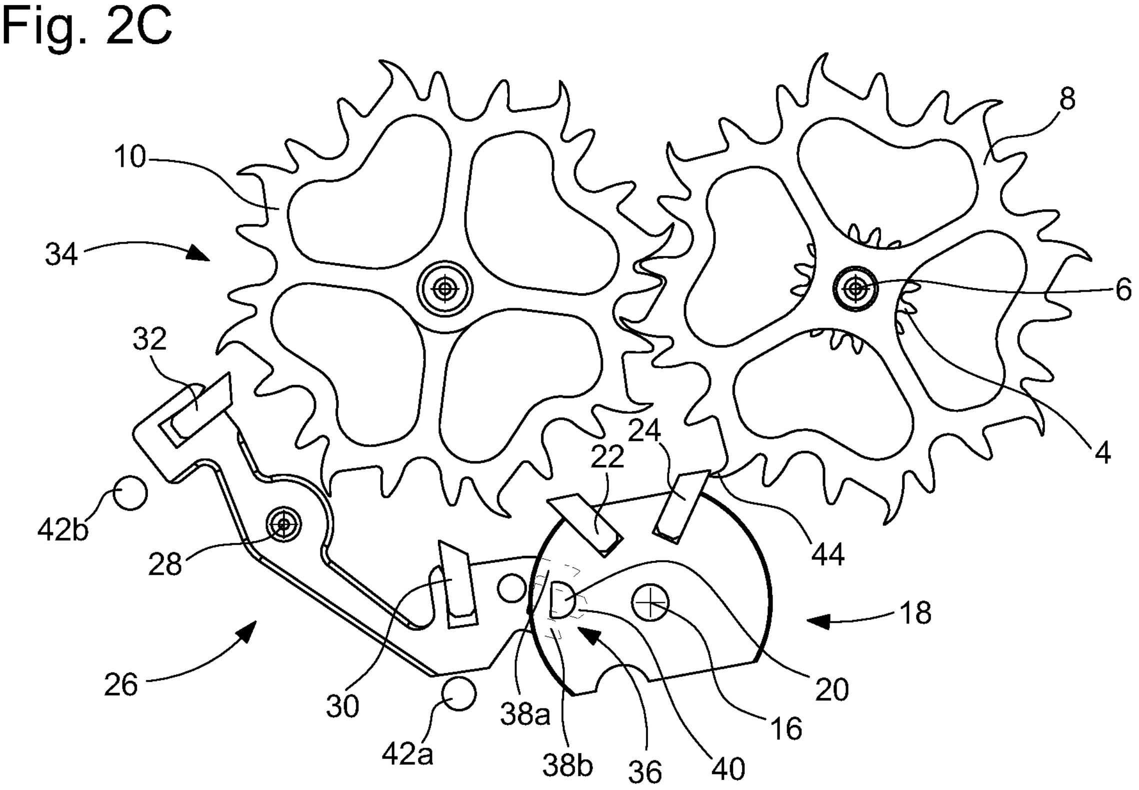
FIG. 2C is a view of the natural escapement at the time when the second escapement wheel is released from its engagement with the exit pallet, which allows the second mobile to drive, via the first escapement wheel, this second escapement wheel, the first escapement wheel further giving, through its impulse tooth, a driving impulse called direct and tangential to the impulse pallet of the balance plate.
Figure 2D:
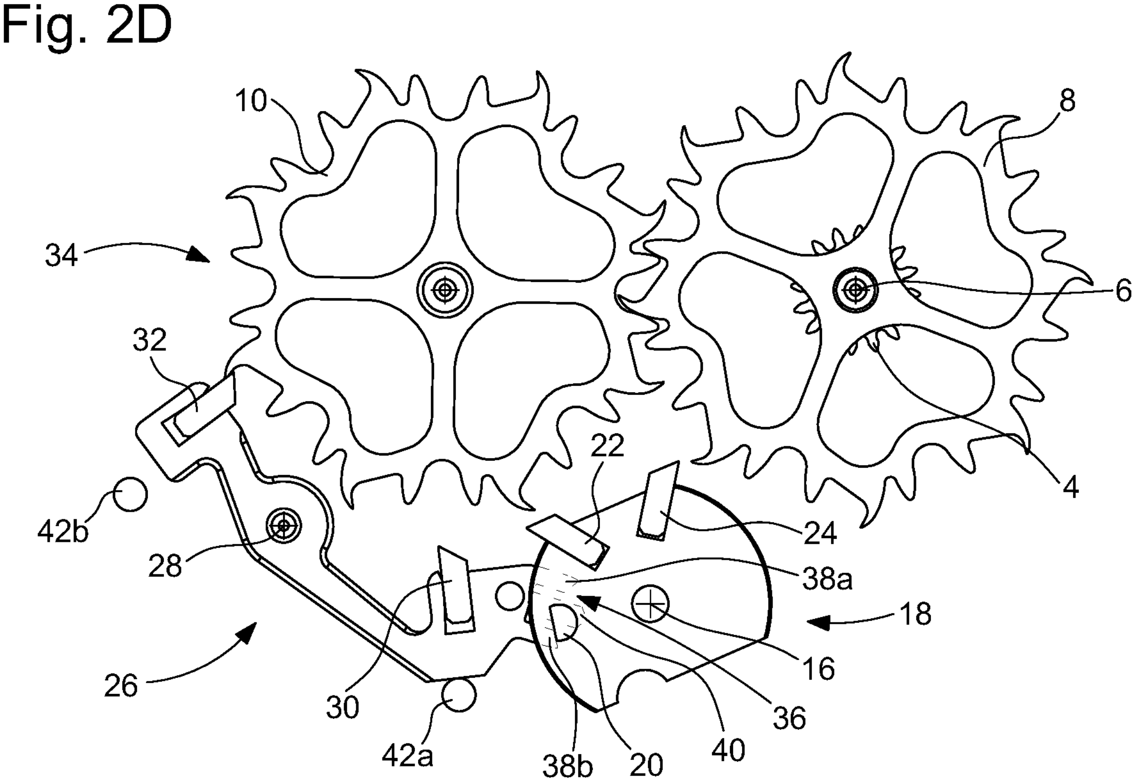
FIG. 2D is a view of the natural escapement at the time when the pivoting of the second escapement wheel is again interrupted when, under the effect of the pivoting of the anchor, this second escapement wheel is pressed on the entry pallet.
Figure 2E:
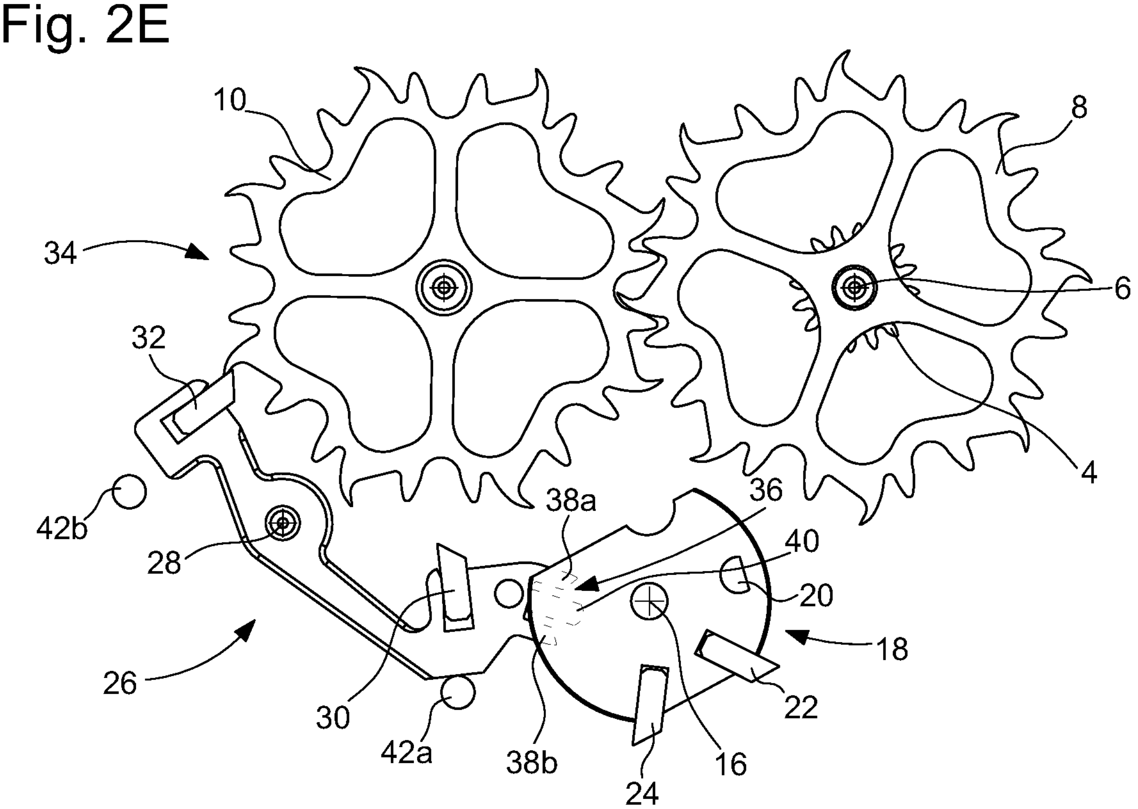
FIG. 2E is a view of the natural escapement at the time when the balance plate is in its second extreme position wherein it is completely removed from its rest position, which marks the end of the first alternation of operation of the natural escapement.

It will be noted that at the same time as the first escapement wheel 8 pivots the second escapement wheel 10 in the counter-clockwise direction, the first escapement wheel 8 also gives a driving impulse to the balance plate 18 via one of its teeth 44, called impulse tooth, which drives the second impulse pallet 24 (see FIG. 2C). This driving impulse is called direct and tangential impulse because it is given directly by the first escapement wheel 8 to the balance plate 18 and the path of the impulse tooth 44 tangentially catches that of the second impulse pallet 24 of the balance plate 18, which allows an almost punctual contact and without friction. The balance plate 18 thus moves to its second extreme position wherein it is completely removed from its rest position, which marks the end of the first alternation of operation of the natural escapement 1 (see FIG. 2E).

Figure 2F:
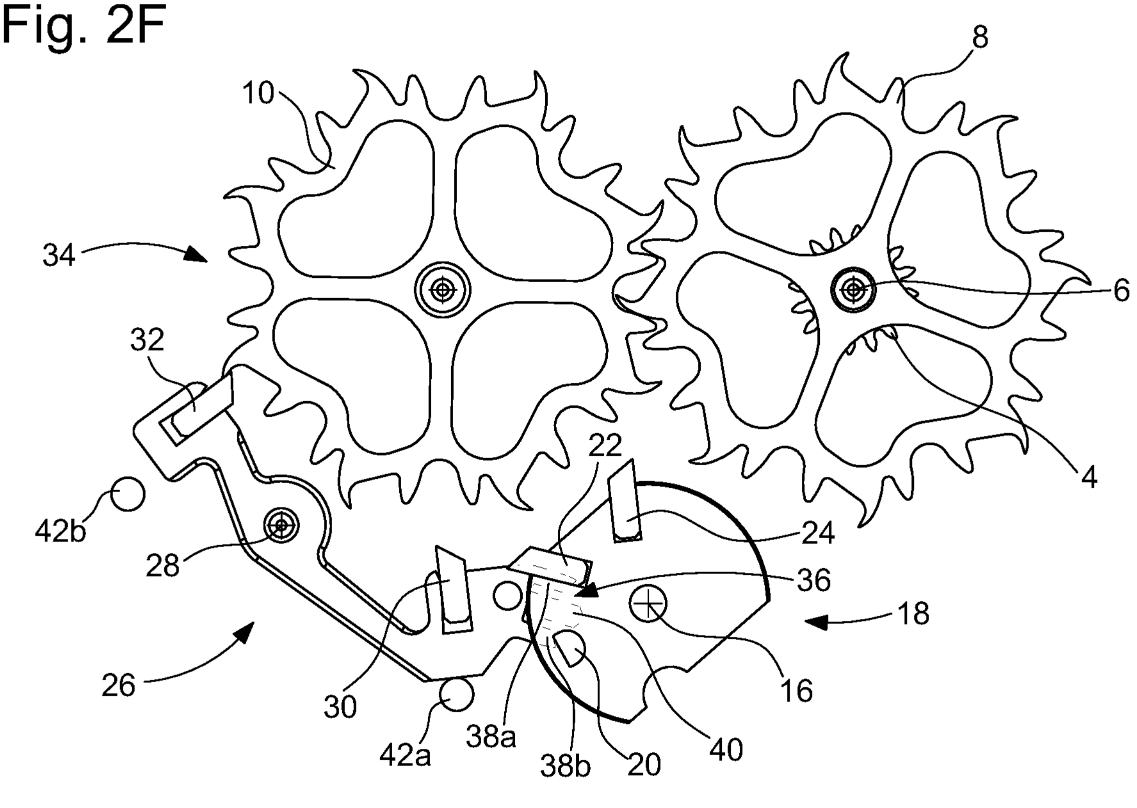
FIG. 2F is a view of the natural escapement at the time when, during the second alternation, the balance plate has returned to its rest position and is about to rotate the anchor again.
Figure 2G:
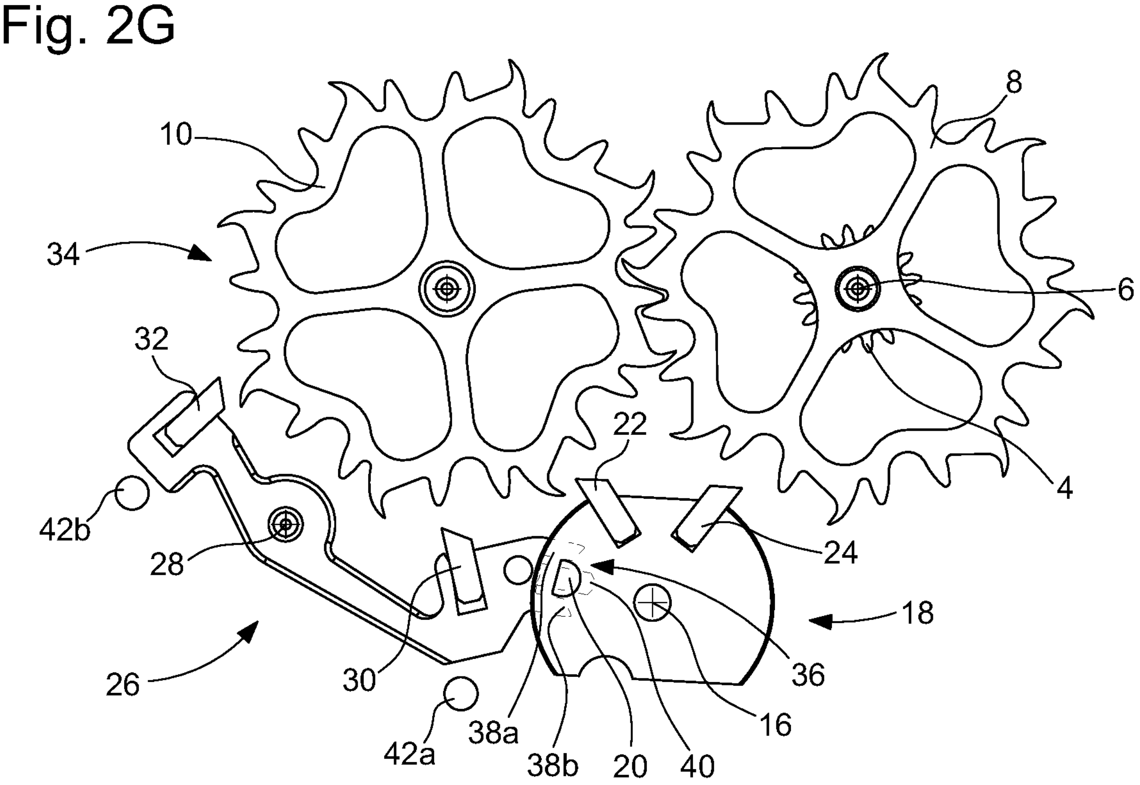
FIG. 2G is a view of the natural escapement at the time when the second escapement wheel is released from its engagement with the entry pallet, which allows the second mobile to drive, via the first escapement wheel, this second escapement wheel.

At the start of the second alternation of operation of the natural escapement 1, the balance plate 18, recalled by the balance spring of the balance (not visible in the drawing), begins to rotate in the clockwise direction until it abuts by its balance pin 20 against the first horn 38*a* of the fork 36 and causes the anchor 26 to pivot in the counter-clockwise direction (see FIG. 2F). The counter-clockwise pivoting of the anchor 26 has the effect of releasing the second escapement wheel 10 from its engagement with the entry pallet 32, which allows the second mobile 2 to drive, via the first escapement wheel 8, the second escapement wheel 10 in the counter-clockwise direction (see FIG. 2G). The pivoting of the second escapement wheel 10 is again interrupted when, under the effect of the pivoting of the anchor 26, this second escapement wheel 10 is pressed on the exit pallet 30, this position being retained thanks to pressing the anchor 26 against the second abutment 42*b* (see FIG. 2I).

Figure 2H:
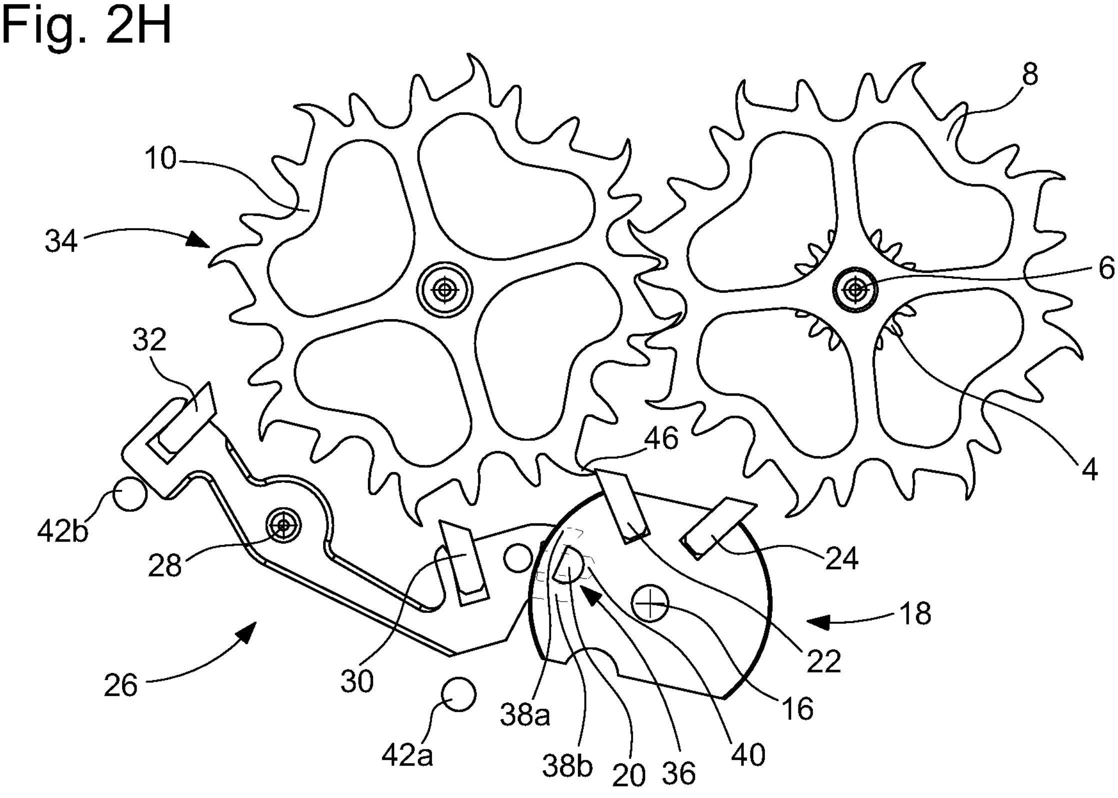
FIG. 2H is a view of the natural escapement at the time when the second escapement wheel gives a driving impulse called direct and tangential to the balance plate via one of its teeth which drives the second impulse pallet.
Figure 2I:
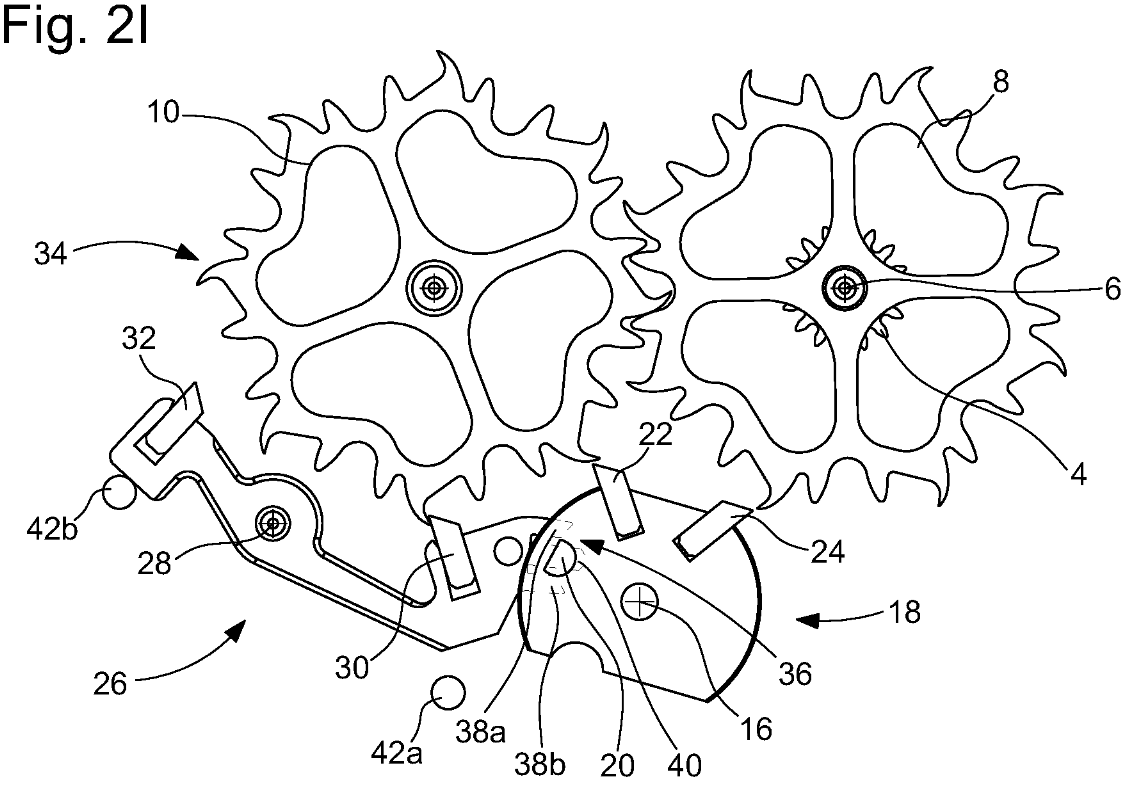
FIG. 2I is a view of the natural escapement at the time when the pivoting of the second escapement wheel is again interrupted when, under the effect of the pivoting of the anchor, this second escapement wheel is pressed on the exit pallet.
Figure 2J:
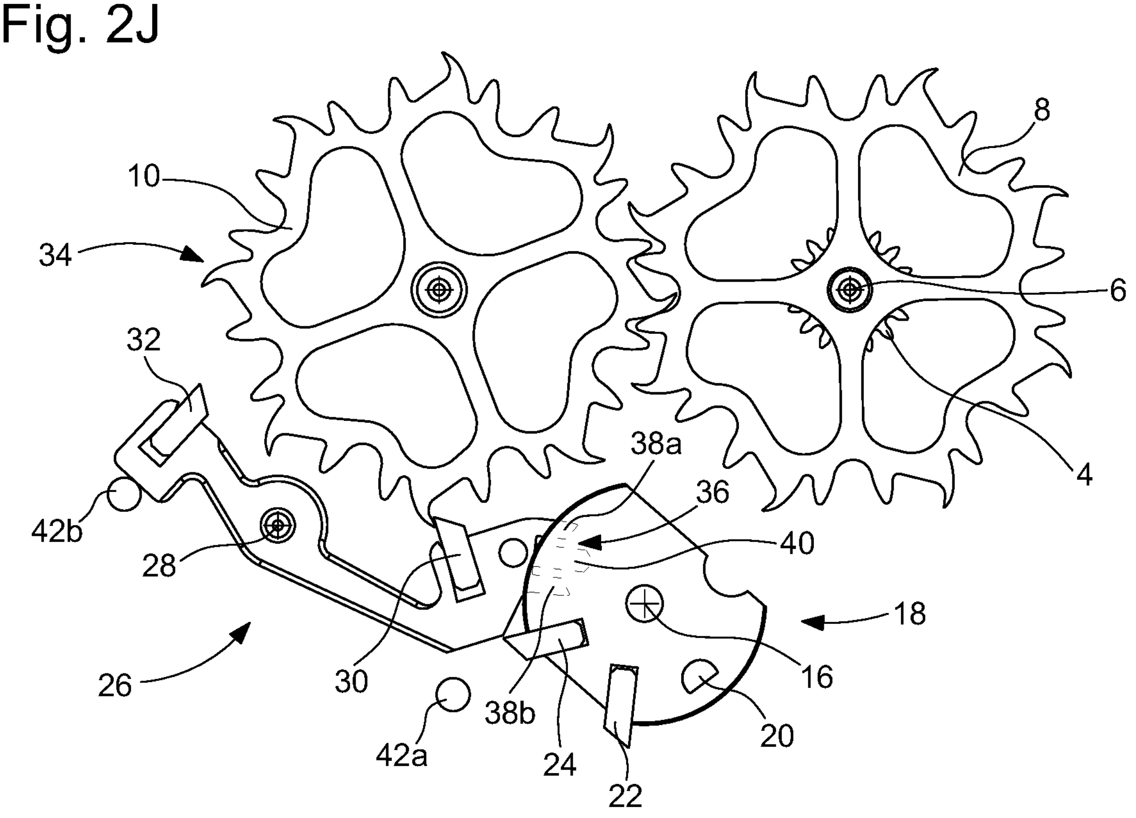
FIG. 2J is a view of the natural escapement returning to its first extreme position, which marks the end of the operating cycle of the natural escapement according to the invention.

It will be noted that at the same time as the first escapement wheel 8 pivots the second escapement wheel 10 in the counter-clockwise direction, the second escapement wheel 10 also gives a driving impulse called direct and tangential to the balance plate 18 via one of its teeth 46 called impulse tooth which drives the first impulse pallet 22 (see FIG. 2H). The impulse is so named because it is given directly by the second escapement wheel 10 to the balance plate 18 and the path of the impulse tooth 46 tangentially catches that of the second impulse pallet 24 of the balance plate 18, which allows an almost punctual contact and without friction. The balance plate 18 thus returns to its first extreme position, which marks the end of an operating cycle of the natural escapement 1 (see FIG. 2J).

Figure 3:
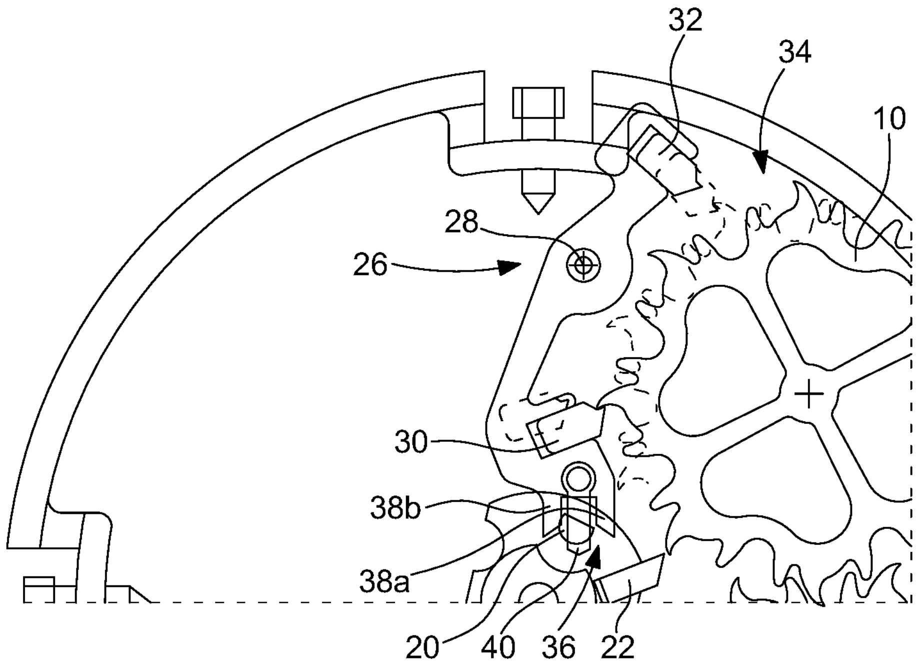
FIG. 3 illustrates a special embodiment wherein the function of the first and second abutments is provided by a specific shape of the exit and entry pallets and the impulse teeth.

It goes without saying that the present invention is not limited to the embodiment which has just been described and that various modifications and simple variants can be considered by the person skilled in the art without departing from the scope of the invention as defined by the claims appended to the present patent application. It will be noted in particular that the function of the first and second abutments 42*a* and 42*b* can also be provided by a specific shape of the exit and entry pallets 30 and 32 and the impulse teeth 44 and 46 as illustrated in FIG. 3. It will also be noted that the balance pin 20 is located outside an acute angle β delimited by two straight lines which pass through the axis 16 of the balance wheel 14 and through the first impulse pallet 22, respectively through the second impulse pallet 24.

NOMENCLATURE

1. Natural escapement
2. Second mobile
4. Pinion
6. Axis
8. First escapement wheel
9. Toothing
10. Second escapement wheel
11. Axis
12. Balance
14. Balance wheel
16. Axis
18. Balance plate
20. Balance pin
22. First impulse pallet
24. Second impulse pallet
26. Anchor
28. Anchor rod
30. Exit pallet
32. Entry pallet
34. Toothing
36. Fork
38*a*, 38*b*. Horns
40. Dart
42*a*. First abutment
42*b*. Second abutment
44. Impulse tooth
46. Impulse tooth

The invention claimed is:

1. A natural escapement (1) for a horological movement performing a succession of operating cycles each composed of a first and a second alternation of a balance (12) which comprises a balance wheel (14) on an axis (16) of which is adjusted a balance plate (18), the natural escapement (1) comprising a first escapement wheel (8) arranged to be driven by a second mobile (2), the first escapement wheel (8) in turn driving a second escapement wheel (10) arranged in the same plane as the first escapement wheel (8), the first and second escapement wheels (8, 10) forming a kinematic chain after which is disposed an anchor (26) capable of pivoting around an anchor rod (28) located outside an angle (α) less than 180° and delimited by a first straight line and a second straight line, the first straight line passing through the axis (16) of the balance wheel (14) and through a pivot axis (6) of the first escapement wheel (8), and the second straight line passing through the axis (16) of the balance wheel (14) and through a pivot axis (11) of the second escapement wheel (10).

2. The natural escapement (1) according to claim 1, characterised in that the balance plate (18) carries a balance pin (20) by which the balance plate (18) causes the anchor (26) to pivot at each of the first and second alternations, the balance plate (18) also carrying a second impulse pallet (24) through which the balance plate (18) receives a direct and tangential driving impulse from the first escapement wheel (8) during the first alternation, and a first impulse pallet (22) through which the balance plate (18) receives a direct and tangential driving impulse from the second escapement wheel (10) during the second alternation, the balance pin (20) being located outside an acute angle (β) delimited by third and fourth straight lines, the third straight line passing through the axis (16) of the balance wheel (14) and through the first impulse pallet (22), and the fourth straight line passing through the axis (16) of the balance wheel (14) and through the second impulse pallet (24).

3. The natural escapement (1) according to claim 2, characterised in that the first escapement wheel (8) comprises a toothing (9) which extends in a single plane and through which the first escapement wheel (8) meshes with the second escapement wheel (10) and provides the direct and tangential driving impulse to the balance plate (18) during the first alternation.

4. The natural escapement (1) according to claim 3, characterised in that the second escapement wheel (10) comprises a toothing (34) which extends in a single plane and through which the second escapement wheel meshes with the first escapement wheel (8) and provides the direct and tangential driving impulse to the balance plate (18) during the second alternation.

5. The natural escapement (1) according to claim 1, characterised in that the anchor (26) comprises means for temporarily locking the second escapement wheel (10) during the second alternation, and means for temporarily locking the second escapement wheel (10) during the first alternation.

6. The natural escapement (1) according to claim 2, characterised in that the anchor (26) comprises means for temporarily locking the second escapement wheel (10) during the second alternation, and means for temporarily locking the second escapement wheel (10) during the first alternation.

7. The natural escapement (1) according to claim 3, characterised in that the anchor (26) comprises means for temporarily locking the second escapement wheel (10) during the second alternation, and means for temporarily locking the second escapement wheel (10) during the first alternation.

8. The natural escapement (1) according to claim 4, characterised in that the anchor (26) comprises means for temporarily locking the second escapement wheel (10) during the second alternation, and means for temporarily locking the second escapement wheel (10) during the first alternation.

9. The natural escapement (1) according to claim 5, characterised in that the anchor (26) comprises an exit pallet (30) for temporarily locking the second escapement wheel (10) during the first alternation, and an entry pallet (32) for temporarily locking the second escapement wheel (10) during the second alternation.

10. The natural escapement (1) according to claim 6, characterised in that the anchor (26) comprises an exit pallet (30) for temporarily locking the second escapement wheel (10) during the first alternation, and an entry pallet (32) for temporarily locking the second escapement wheel (10) during the second alternation.

11. The natural escapement (1) according to claim 7, characterised in that the anchor (26) comprises an exit pallet (30) for temporarily locking the second escapement wheel (10) during the first alternation, and an entry pallet (32) for temporarily locking the second escapement wheel (10) during the second alternation.

12. The natural escapement (1) according to claim 8, characterised in that the anchor (26) comprises an exit pallet (30) for temporarily locking the second escapement wheel (10) during the first alternation, and an entry pallet (32) for temporarily locking the second escapement wheel (10) during the second alternation.

13. The natural escapement (1) according to claim 1, characterised in that the anchor (26) comprises a fork (36) formed of a first and a second horn (38*a*, 38*b*), the balance plate (18) abutting by its balance pin (20) against the second horn (38*b*) of the fork (36) and causing the pivoting of the anchor (26) in a first direction during the first alternation, and against the first horn (38*a*) during the second alternation, causing the anchor (26) to pivot in a second direction opposite to the first direction.

14. The natural escapement (1) according to claim 13, characterised in that the fork (36) carries a dart (40) which cooperates with the balance plate (18) to prevent accidental movements of the fork (36).

15. The natural escapement (1) according to claim 1, characterised in that the first and second escapement wheels (8, 10) are each made in one piece and each comprise a single level of toothing.

16. The natural escapement (1) according to claim 9, characterised in that a pivoting displacement of the anchor (26) is limited by a first and a second abutment (42*a*, 42*b*).

17. The natural escapement (1) according to claim 16, characterised in that the limitation in displacement of the anchor (26) is provided by a specific shape of the exit and entry pallets (30, 32) and the impulse teeth (44, 46).

18. A horological movement comprising a natural escapement (1) according to claim 1.

* * * * *